US010686612B2

(12) United States Patent
Jacquin et al.

(10) Patent No.: US 10,686,612 B2
(45) Date of Patent: Jun. 16, 2020

(54) CRYPTOGRAPHIC DATA

(71) Applicants: Ludovic Emmanuel Paul Noel Jacquin, Bristol (GB); Liqun Chen, Bristol (GB); Fraser Dickin, Bristol (GB); Chris I. Dalton, Bristol (GB); Hewlett Packard Enterprise Development LP, Houston, TX (US)

(72) Inventors: Ludovic Emmanuel Paul Noel Jacquin, Bristol (GB); Liqun Chen, Bristol (GB); Fraser Dickin, Bristol (GB); Chris I. Dalton, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 334 days.

(21) Appl. No.: 15/573,688

(22) PCT Filed: Jul. 30, 2015

(86) PCT No.: PCT/EP2015/067543
§ 371 (c)(1),
(2) Date: Nov. 13, 2017

(87) PCT Pub. No.: WO2017/016609
PCT Pub. Date: Feb. 2, 2017

(65) Prior Publication Data
US 2018/0152305 A1    May 31, 2018

(51) Int. Cl.
*H04L 9/08*        (2006.01)
*H04L 9/32*        (2006.01)
(Continued)

(52) U.S. Cl.
CPC .......... *H04L 9/3268* (2013.01); *H04L 9/0869* (2013.01); *H04L 9/0894* (2013.01);
(Continued)

(58) Field of Classification Search
CPC ....................................................... G06F 21/57
See application file for complete search history.

(56) References Cited

U.S. PATENT DOCUMENTS 5,978,484 A    11/1999  Apperson et al.
6,104,810 A  *  8/2000  DeBellis ................. G06F 7/582
                                                    380/43
(Continued)

FOREIGN PATENT DOCUMENTS

CN            101330438          12/2008

OTHER PUBLICATIONS

"Hardware random generator—Wikipedia", 10 pages, published: Dec. 4, 2019. (Year: 2019).*

(Continued)

*Primary Examiner* — Ponnoreay Pich
(74) *Attorney, Agent, or Firm* — Hewlett Packard Enterprise Patent Department

(57) ABSTRACT

Examples set out herein provide a method comprising using first cryptographic key data specific to a computing device to verify a package of machine readable instructions to run on the computing device. The verified package may be executed to generate a random number using a true random number generator of the computing device, and to store the generated random number. Second cryptographic key data may be generated by a pseudorandom number generator of the computing device based on a seed comprising a combination of the random number as a first seed portion and a second seed portion. A portion of the second cryptographic key data may be sent to a certifying authority. The method may further comprising receiving a certification value based on the sent portion of the second cryptographic key data from the certifying authority and storing the certification value.

20 Claims, 4 Drawing Sheets

(51) Int. Cl.
*H04L 9/14* (2006.01)
*G06F 7/58* (2006.01)

(52) U.S. Cl.
CPC .............. *H04L 9/14* (2013.01); *H04L 9/321* (2013.01); *H04L 9/3263* (2013.01); *G06F 7/582* (2013.01); *G06F 7/588* (2013.01)

(56) References Cited

U.S. PATENT DOCUMENTS

| | | | |
|---|---|---|---|
| 6,678,707 B1* | 1/2004 | Butler | G06F 7/588 708/250 |
| 6,687,375 B1 | 2/2004 | Matyas et al. | |
| 7,231,044 B2* | 6/2007 | Dube | G06F 21/6218 380/258 |
| 8,050,409 B2 | 11/2011 | Agrawal et al. | |
| 8,700,894 B2 | 4/2014 | Hammel et al. | |
| 8,924,730 B2 | 12/2014 | Carlson et al. | |
| 9,672,342 B2* | 6/2017 | Walsh | H04L 9/3236 |
| 2001/0056534 A1* | 12/2001 | Roberts | G06F 7/588 713/168 |
| 2011/0010552 A1* | 1/2011 | Hoornaert | H04L 9/0897 713/172 |
| 2014/0052877 A1 | 2/2014 | Mao | |
| 2014/0325227 A1 | 10/2014 | Brown | |
| 2015/0372813 A1* | 12/2015 | Brand | H04L 9/0841 713/156 |

OTHER PUBLICATIONS

International Search Report and Written Opinion, International Application No. PCT/EP2015/067543, dated Feb. 26, 2016, pp. 1-10, EPO.

Office Action, EP Application No. 15744571.9, dated Oct. 26, 2018, pp. 1-9, EPO.

Xiaoyu Ruan, "Chapter 11: Looking Ahead: Tomorrow's Innovations Built on Today's Foundation," Aug. 9, 2014, pp. 227-238, IEEE.

Multi-tenant Data Architecture; Jun. 2006; 9 pages.

Prasad, C.K. et al.; "Public Key Cryptography by Centralized Offline Server in Mission-critical Networks"; Jun. 2012; 7 pages.

"Trusted Platform Module Library Specification, Family 2.0", Level 00, Revision 01.16, Oct. 30, 2014, 163 pages.

Berger et al., "vTPM: Virtualizing the Trusted Platform Module", Security '06: 15th USENIX Security Symposium, 2006, pp. 305-320.

Christianverstraete, "The Machine, a view of the future of computing", available online at <https://web.archive.org/web/20140724171302/http://h30507.www3.hp.com/t5/Cloud-Source-Blog/The-Machine-a-view-of-the-future-of-computing/ba-p/164568>, Jul. 24, 2014, 7 pages.

* cited by examiner

CRYPTOGRAPHIC DATA

BACKGROUND

A computer network may comprise a number of nodes. In some examples, each node is an individual computing device, and may be used by a number of users or tenants, who may be individual end users, packages of machine readable instructions, such as a software or firmware program or application, or another node of the computing network. For security reasons, it may be the case that nodes and/or their individual tenants operate using cryptographic data.

BRIEF DESCRIPTION OF DRAWINGS

Examples will now be described, by way of non-limiting example, with reference to the accompanying drawings, in which.

DETAILED DESCRIPTION

The following detailed description refers to the accompanying drawings. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Figure 1:
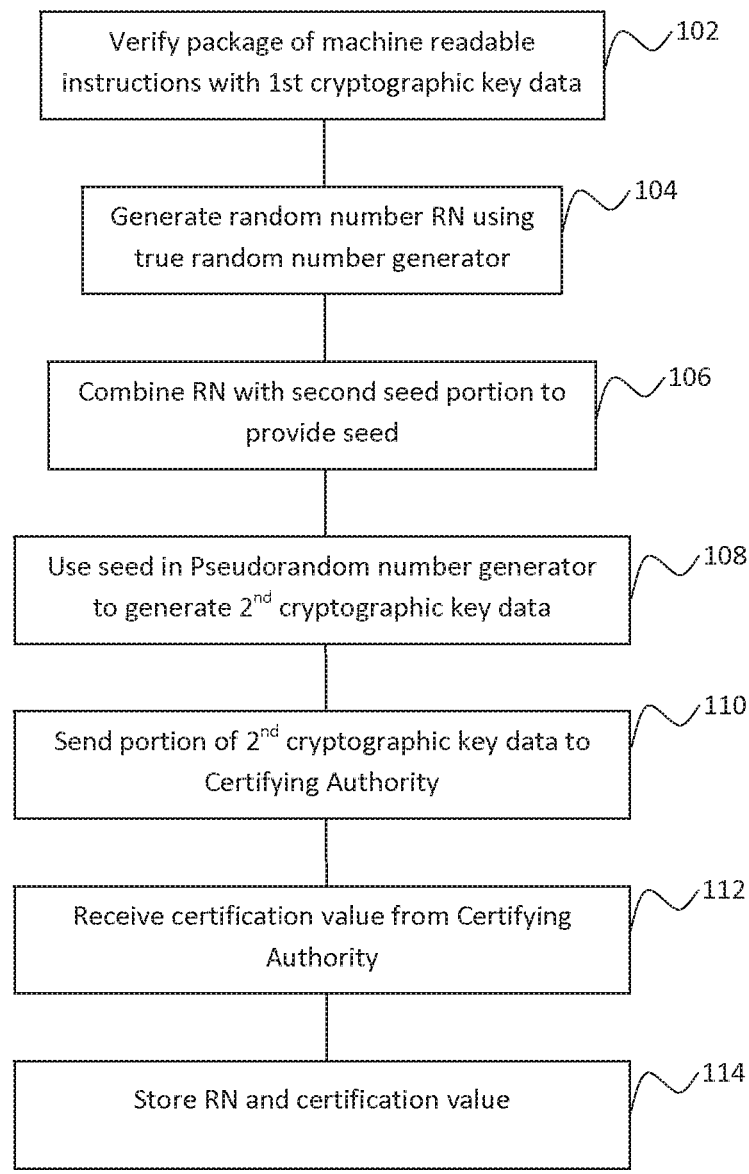
FIG. 1 is a flowchart of an example of a method of providing a computing device with cryptographic data.

FIG. 1 is a flow chart showing an example of a method of providing a computing device, for example a computing device to provide a node of a computer network, with cryptographic data. Distributing and storing cryptographic data presents a technical challenge as the data must remain secret and secure throughout distribution and use. Following distribution, it may be the case that only certain authorised entities are permitted to supply packages of machine readable instructions (e.g. software updates or upgrades) and secure authorisation of such packages is a technical challenge. A similar challenge is provided in allowing clients or users to access a computing device. This should be achieved securely and efficiently, both in terms of the processing required and the memory space taken up.

In some examples, the method of FIG. 1 may be carried out before distribution of a computing device, for example before sale or deployment thereof, and may be carried out in a secure or trusted environment.

In block 102, first cryptographic key data specific to a computing device is used to verify a package of machine readable instructions to run on the computing device. In an example, the first cryptographic key data is a treatment of a public key specific to the computing device. For example, the first cryptographic key data may comprise a hash, or the result of some other processing, carried out on at least part of public cryptographic key data. In one example, the first cryptographic key data may comprise a hash (or another treatment) of a portion of a public key such as a 'Root of Trust' public key for the device, i.e. a key which the operating system of a computing device can trust absolutely. The treatment and/or portion of key data used may be specific to the computing device. In such examples, the first cryptographic key data may provide the computing device with a device-specific private key.

As noted above, in some examples, this may be carried out in a secure environment, such as on a computing device manufacturer's premises. In some such examples, the first cryptographic key data may be, or may be derived based on, a secret of the manufacturer. In some examples, the first cryptographic key data, and/or the method of treating the data on which the first cryptographic key data is based may be supplied from a different entity to that carrying out the method. For example, it may be that the method is performed by the device manufacturer, but the first cryptographic key data may be, or may be derived based on, a secret of an entity such as operator (or intended operator) of the device.

In some examples, the first cryptographic key data may be, or may be derived based on, a secret of an entity which is authorised to deploy machine readable instructions for execution by the computing device (which entity may comprise the manufacturer, or an intended operator, or some other entity). When a package of machine readable instructions (for example, a software or firmware program as an update or an upgrade) is supplied, the authorised entity may sign the package with a signature which can be verified against first cryptographic key data.

In some examples the first cryptographic data may be provided to the computing device by an in-system programmer (ISP), which effectively 'hardcodes' the first cryptographic key data to a memory, such that the first cryptographic key data cannot be altered for the lifetime of the memory. In some examples a memory which can exclusively be programmed by an ISP or the like (i.e. a device which can write to a memory which is installed in a processing device, rather than pre-programmed before installation) may be used to hold the first cryptographic key data.

The first cryptographic key data used in block 102 may be to verify a package of machine readable instructions as being authorised to run on the computing device. For example the package of machine readable instructions may have been signed using data which can be verified using the first cryptographic key data (which may comprise the first cryptographic key data itself). A package of machine readable instructions signed by a signing entity which has access to the first cryptographic key data (in some examples, the same entity that supplied the first cryptographic key data) is deemed to be trusted. Therefore, if the signature is verified against the first cryptographic key data, the package of machine readable instructions is considered to be verified and may be permitted to execute. In some examples, the first cryptographic key data may also be used to verify authorised packages of machine readable instructions supplied in use of the computing device following its deployment, the packages being signed with data which can be verified against the first cryptographic key data.

In blocks 104 to 108, the verified package of machine readable instructions is executed by the computing device. These blocks may for example be carried out on first boot of the computing device, and may be carried out while the computing device remains in a trusted environment. When the package of machine readable instructions is executed, in block 104, a random number is generated using a true random number generator of the computing device. This random number is also stored. This may be on generation but in this example is in block 112 below. In block 106, a seed is generated for a pseudorandom number generator of the computing device using the random number generated in block 104 as a first seed portion and a second seed portion.

The second seed portion may be a secret known to an entity authorised to control authorisation of users to use the computing device (for example, intended owner or operator of the computing device), and, in some examples, not known to the entity carrying out the method of FIG. 1. The second seed portion may be a secret 'salt' which is added to the first key portion. In some examples, the second seed portion is not stored in the computing device, and/or knowledge of this data is used in subsequent processes in order to prove an identity or to provide an authorisation. For example, if a user requests access to the computing device, it may be that the second seed portion is also be requested or supplied in order to allow validation of this request. In other examples, it may be that second seed portion is requested or supplied in order to allow validation of new software or the like.

The combination of the first and second seed portions may be made in any way, from a simple concatenation to any interleaving or predetermined treatment thereof. However the combination process may be repeatable such that the seed may be regenerated in subsequent verification processes.

In block 108, the seed provided by the combination of the first and second seed portions is used in a pseudorandom number generator to produce second cryptographic key data. In some examples, the random number generated in step 104 which provides the first seed portion may be large enough that, even if the second seed portion (for example, an intended operator's secret salt) is compromised, the second cryptographic key data remains effectively secure, as the (still secret) first seed portion is needed to recreate the second cryptographic key data.

If the first cryptographic key data, which underlies the derivation of the second cryptographic key data, can be trusted (i.e. treated as a Root of Trust key), and the process is carried out in a trusted environment, the second cryptographic key data can also be trusted.

The verified package of machine readable instructions further operates to send at least a portion of the second cryptographic key data to a certifying authority (block 110). In some examples, the second cryptographic key data is used to provide a public key portion, which is sent to the certifying authority, and a private key portion, i.e. the second cryptographic key data provides a public/private key pair. In such examples, the pseudorandom number generator has acted as an entropy source for providing such a public/private key pair.

In block 112, a certification value is received back from the certifying authority. The certifying authority may be any endorsement station. In one example, if the process is being carried out in a trusted environment of the manufacturer, the certifying authority may be the manufacturer. In other examples, the certifying authority may be the intended operator or owner of the computing device, or may be a trusted institution acting on behalf of the manufacturer, intended operator or owner or any other trusted entity.

In block 114, both the random number generated in block 104 and the certification value are stored. These may be stored so as to be retrievable for use in verification processes. In some examples, the random number may be stored in a one-time programmable memory of the computing device, which may be a tamper proof one-time programmable memory.

The method of FIG. 1 therefore allows second cryptographic key data to be securely associated with a computing device based on, for example, a Root of Trust public key which provides the first cryptographic key data. The trust associated with such a Root of Trust public key flows through to the second cryptographic key data, which may form the basis of a cryptographic identity for the device. The method may be carried out in a secure environment before distribution of the computing device. As further set out below, this technical solution to providing a computing device with cryptographic data provides a scalable basis for efficient and secure verification of new package(s) of machine readable instructions, verification of new users of the computing device (and the provision of cryptographically strong identities to users), and/or verification of a request to invalidate a cryptographic identity of a computing device following distribution and deployment of the computing device. The computing device itself is also supplied with a cryptographically strong identity.

In some examples, the method of FIG. 1 may be executed using Read Only Memory (ROM) code. In one example, in which the first cryptographic key data is based on a Root of Trust Public Key (RoTPK), block 102 may comprise loading the RoTPK from a predefined storage area, and checking the hash of the RoTPK with the first cryptographic key data. The RoTPK may be held in a memory or processor the computing device, so that the RoTPK is securely bonded to the computing device. The process may halt if there is an error, but if the check is verified, a package of machine readable instructions may be loaded from a predefined storage area, which may be internal or external to the computing device. If the package of machine readable instructions has been validly signed by the private key corresponding to the RoTPK (as verified against the first cryptographic key data), the package of machine readable instructions is executed.

In some examples, the intended operator or user may be a package of computer readable instructions (for example, the intended operator may be a computer program), and the method may be carried out on an automated basis.

Figure 2:
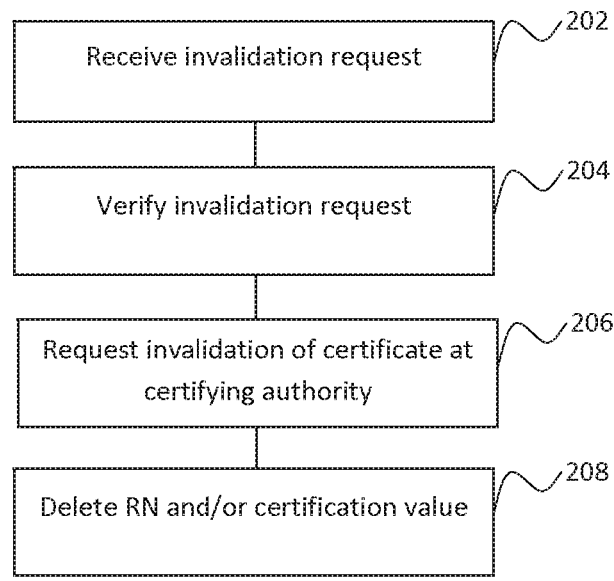
FIG. 2 is a flowchart of an example of a method of invalidating a cryptographic identity of a computing device.

FIG. 2 shows a method which may, for example, comprise part of decommissioning, re-commissioning, or repurposing of a computing device. This method may also be carried out in a trusted environment, for example an environment controlled by the computing device owner or the computing device manufacturer. It will be noted that the second cryptographic key data is used in the method. Therefore, the method may be carried out by or in association with an entity which is able to supply the second seed portion to allow recreate the second cryptographic key data.

In block 202, a request for invalidation of the certification value is received, the request comprising the second seed portion (in some examples, an operator's secret salt) of the second cryptographic key data. In block 204, the supplied second seed portion is verified against the second cryptographic key data. This verification may comprise attempting to regenerate the second cryptographic key data by combining the supplied purported second seed portion with the random number held in the memory of the computing device, and validating at least a portion of this against the certification value.

If this verification is successful, in block 206, the computing device requests that the certification value be revoked at the certifying authority. In some examples, this request may comprise a challenge based on the first cryptographic key data so that the certifying authority's identity is verified. In some examples, such a challenge allows a validation that the certifying authority which provided the computing device with its cryptographic identity is the same certifying authority now decommissioning the device (or is trusted by that certifying authority). In block 208, at least one of the certification value and the random number generated by the true random number generator stored on the computing device (for example, as described in relation to block 104 above) are deleted. In examples where the memory holding the random number is a one-time programmable memory, this may be not readily deleted (except by removal or destruction of the one-time programmable memory). However, if the certification value is deleted, for any request made thereafter using the second seed portion, there will be nothing to prove that regenerated second cryptographic key data is genuine: the computing device can no longer prove the authenticity of its second cryptographic key data, and thus validation processes (for example as described in relation to FIG. 4 below) will fail and the cryptographic identity of the computing device is effectively revoked. If the random number is deleted, it will no longer be possible to regenerate the second cryptographic key data.

Figure 3:
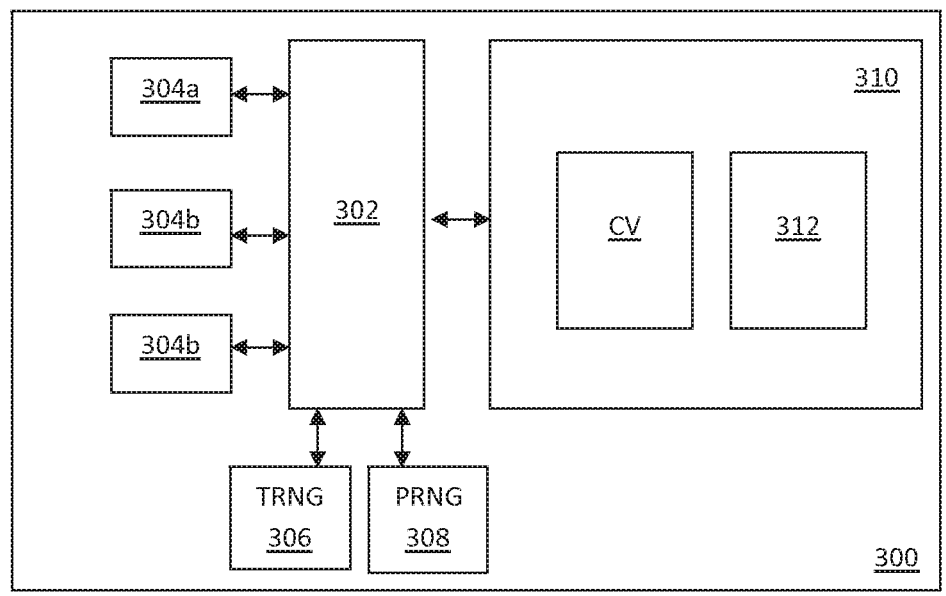
FIG. 3 is a simplified schematic of an example of a computing device.

FIG. 3 is a schematic representation of a computing device 300 comprising a processor 302; a first 304*a*, second 304*b* and third 306*b* key data memory portion, a true random number generator 306, a pseudorandom number generator 308 and a memory 310 holding machine readable instructions for execution by the processor 302.

The first key data memory 304*a* portion holds first cryptographic key data associated with the computing device. In this example, the first cryptographic key data is a device specific treatment of a public key. For example, this may be data received in block 102 above. The second key data memory portion 304*b* holds a random number, the random number having been generated by the true random number generator 308 of the computing device. For example, this may be a random number as generated in block 104 above. In this example, the third key data memory portion 304*b* is to hold user specific cryptographic key data, the user cryptographic key data being generated using the true random number generator.

The memory 310 holds a certification value CV, the certification value having been received from a certifying authority based on data generated by the pseudorandom number generator 308 using a seed comprising a combination of a first seed portion based on the random number held in the second key data memory portion 304*b* and a second seed portion. For example, this may be a certification value as received in block 112 above. This certification value may be used to verify a user's request to access the computing device 300.

The memory 310 also holds machine readable instructions 312 which may comprise instructions which have been verified using the first cryptographic key data (for example a package of machine readable instructions as verified in block 102 above, or as verified in a separate process), and which may be executed by the processor 302.

In this example, the pseudorandom number generator 308 and the key data programmable memories 304 are tamper proof, in that attempts to access the data therein will result in access to the memory being disabled permanently, deletion of configuration data or the like.

At first deployment of the computing device 300, the third key data memory portion 304*c* may be empty. In such examples, the third key data memory portion 304*c* may later be populated with user cryptographic key data. In some examples, the third key data memory portion 304*c* may be populated with user cryptographic key data for use in generating user specific cryptographic key data for a plurality of users. In some examples, user specific cryptographic key data may be generated following verification that a request for user specific cryptographic key data is supplied in association with the second seed portion. This verification may comprise attempting to regenerate the second cryptographic key data by combining the supplied purported second seed portion with the random number held in the memory of the computing device, and validating at least a portion of this against the certification value CV.

For example, if the second seed portion is an operator's secret salt, the operator may allow user specific cryptographic key data to be generated for a particular user by allowing the second seed portion to be included in, or otherwise associated with, a request for user specific cryptographic key data. If the user is not authorised, the second seed portion may be withheld. In some examples, the user (which term includes both a human end user and a package of computer readable instructions) may supply the second seed portion directly to the computing device (for example, though use of keyboard entry, or with a security token or other way). In other examples, the user may be registered and validated with the operator (or any other entity who holds the secret of the second seed portion), who will supply the second seed portion for the user. Further discussion in relation to issuing user specific cryptographic key data is provided below in relation to FIGS. 4 and 5 below.

In some examples there may be one or a plurality of additional key data memory portions 304, for example, one key data memory portion 304 for each actual or anticipated user of the computing device 300 which may serve as a multi-tenanted node. As the memory space dedicated to a particular user in such an example is small, the number of users can be large. In other examples, a single random number comprising a user identity seed may comprise user cryptographic key data which is held in a key data memory portion 304 and may be used to generate user specific cryptographic key data for multiple users, with each user supplying an additional, user specific, seed portion as further set out below. This further reduces the minimum memory specifications. It may additionally be noted that storing a seed is more space efficient than storing a key.

In some examples, each of the key data memory portions 304 is a one-time programmable memory, and access to the memory portions is restricted to verified packages of machine readable instructions run on the processor 302 of the same computing device 300 (in some examples, only a subset of verified packages may be permitted to access the memory portions 304). The key data memory portions 304 may be tamperproof and isolated from one another. In some examples, a one-time programmable memory space is partitioned to provide the key data memory portions 304. Partitioning of a memory space and access control may be carried out using low-level code operating on the processor 302.

In a particular example, the first key data memory portion 304*a* may hold, or be based on, data which is a secret (for example a hash of a Route of Trust Public Key, where the manufacturer wherein the processing to produce the hash is a secret of the manufacturer, a seed, or simply key data) of a first entity, which is trusted to provide packages of machine readable instructions. The first entity may in some examples be the device manufacturer. The second key data memory portion 304*b* may hold a secret random number which can be combined with a secret (the second seed portion) of an access authority entity of the device 300 to produce a value which can be certified against the certification value. The access authority entity may be to control which users are allowed to access the computing device 300. In some examples, the access authority entity is an actual or intended operator of the computing device 300. In some examples, the secrets held in the key data memory portions 304 can be trusted as the secrets were installed or generated while the computing device 300 was in a trusted environment. The access authority entity and the first entity may be the same entity or different entities.

If for example the first entity wishes to deploy new packages of executable instructions, these may be signed using a secret of the first entity, which can be validated against the data held in the first key data memory portion 304a. If the access authority entity wants to allow a particular user to be a tenant of the computing device 300, this may be achieved by providing the user with their secret or providing their secret with a request to generate a cryptographic identity for the user, and this secret can be validated against the certification value CV. If revocation of the credentials of the computing device 300 is intended, this may also be requested by the access authority entity using their secret. A certifying authority may be validated using against the data held in the first key data memory portion 304a.

Thus a computing device 300 may be deployed with the information necessary to allow authorised packages of executable instructions to be added thereto, allowing for secure updates and upgrades of the computing device 300. Furthermore, the computing device 300 may be deployed with the information necessary to allow authorised prospective users thereof (e.g. users authorised by access to the access authority entity's secret) to be issued with cryptographic identity to use as a tenant of the computing device.

The third key data memory portion 306c may be to hold a secret which may be, or may be used in generating, user specific key data, for example to provide a user with a cryptographic identity for use on the computing device. A new user may provide their own secret to generate the cryptographic identity, thus being able to secure their information against other users. Such identities may be generated and issued efficiently, and do not make use of excessive amounts of storage space.

Figure 4:
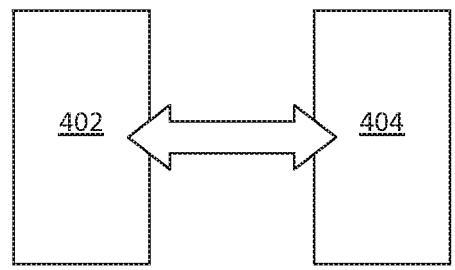
FIG. 4 is a simplified schematic of an example of a processor and a memory.

FIG. 4 is an example of a processor 402 in communication with a memory 404. The processor 402 may for example act as a processor 302 as described in relation to FIG. 3, and the memory 404 may act as the memory 310. In this example, the memory 404 is a non-transitory computer readable medium comprising instructions, which, when executed, cause the processor 402 of a computing device to request operator key data from an operator of a device. This operator key data may serve as the second seed portion in the processes described above, and may for example comprise an operator's 'secret salt' data. In this example, the operator is an access authority entity, and operates the computing device at least to the extent of acting as a gate keeper to users wishing to access the computing device resources. The memory 404 may also store instructions which, when executed by the processor 402, cause the processor 402 verify received key data by generating a key using the received key data and a random number held in a memory of the computing device, and which when executed verify the generated key against a certificate held in a memory of the device, the certificate having been generated based on verified owner key data and a random number generated by a true random number generator of the device (e.g. the certification value CV mentioned above). A random number may be requested from a true random number generator of the computing device, and used to generate a first user identity key portion for generating an identity for a user of the device. In some examples, this is requested following verification of the operator key data. In other examples, the operator key data may be requested and/or supplied after generation of the random number, and then verified.

In some examples, the memory 404 may comprise instructions which, when executed, cause the processor 402 to request a second user identity key portion from a user of the device, and combine the first and second user identity key portions to derive a user identity for a user of the computing device. In some examples, the memory 404 may comprise instructions which, when executed, cause the processor 402 to derive the user identity by using a combination of the first and second user identity key portions as seed values in a pseudorandom number generator.

In some examples, the memory 404 may comprise instructions which, when executed, cause the processor 402 to verify that a received package of information is signed using data which can be verified against key data held in a memory of the computing device. This may for example be first cryptographic key data as described above.

In some examples, the memory 404 may comprise instructions which, when executed, cause the processor 402 to verify that a received request for invalidation of the certification value comprises the operator key data and, if so, to delete the certification value held in the memory. The instructions may further when executed, cause the processor 402 to send a request to a certifying authority, requesting revocation of the certificate value at the certifying authority.

Figure 5:
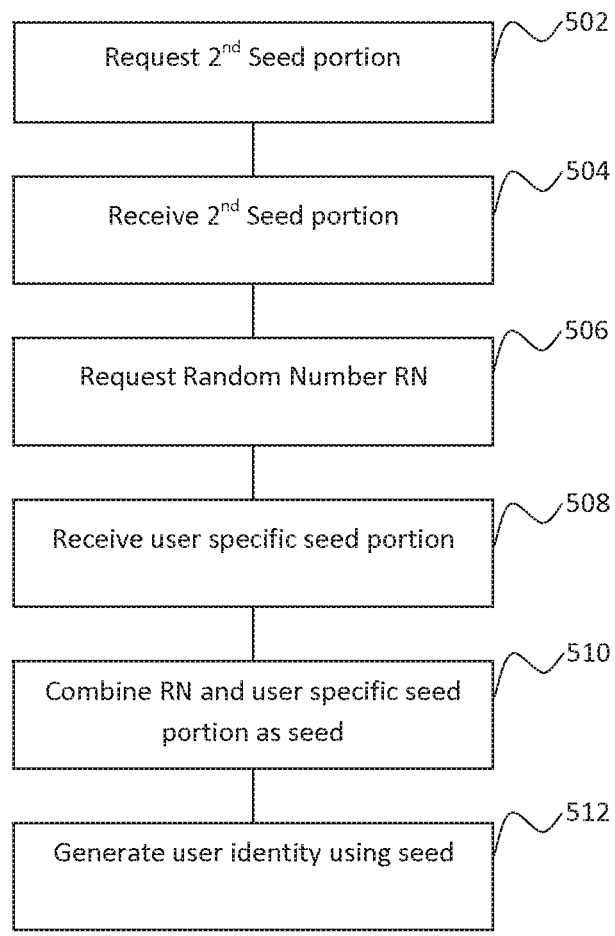
FIG. 5 is a flowchart of an example of a method of providing users with cryptographic identities.

An example of a process carried out on execution of computer readable instructions is set out in FIG. 5. A computing device such as described in relation to FIG. 3 above may be deployed, and an intended user or tenant associated therewith. In block 502, the package of machine readable instructions executing on a processor (such as the processor 302, 402 described above) requests the second seed portion. If, in block 504, this is received and verified against the stored certification value (indicating that the operator trusts the proposed user), a random number is requested (block 506). In some examples, this is requested from a True Random Number Generator of the device. In other examples, this random number may be held in a memory (for example having been previously generated by a True Random Number Generator of the device). This acts a user identity seed. In this example, the user identity seed is written to/retrieved from a one-time programmable memory, although other memory types may be used. In block 508, a user provides a user specific seed portion. The user specific seed portion is combined with the user identity seed to provide a seed (block 510), and this is used by a pseudo random generator of the computing device to produce user specific key data, providing the user with a cryptographic identity (block 512). The user identity seed therefore provides a first user identity key portion and the user specific seed portion provides a second user identity key portion, and these may be combined the first and second user identity key portions to derive a user identity for a user of the device. Verification, for example based on the second seed portion (or the operator key data), may occur prior to generating the first user identity key portion, and/or prior to generating the user identity.

The user specific seed portion may remain the user's secret. The user identity seed may also remain secret to restrict the amount of accessible key data, although the confidentiality of the user specific seed portion may be sufficient to ensure security of the user specific key data.

In some examples, multiple users can request some entropy to produce user specific key data based on an individual user specific seed portion and the user identity seed. In such examples, the user identity seed may remain secret even from a user in order to protect the security of the other users.

In other examples, a user may be authorised in another way, for example through use of a certifying authority. In some examples, the second cryptographic key data (for example, the private portion thereof) may be used to certify a public key, and the certification value for this may be stored on the computing device. In such an example, if user can provide this certificate, the user can be verified by the certifying authority.

In some examples a package of machine readable instructions may give full control of the user identity seed to another such package (which can be customer specific) running on the processor 302, 402. In such an example, as the verified package can no longer enforce access control over the user identity seed, the package may be certified by different first cryptographic key data.

Figure 6:
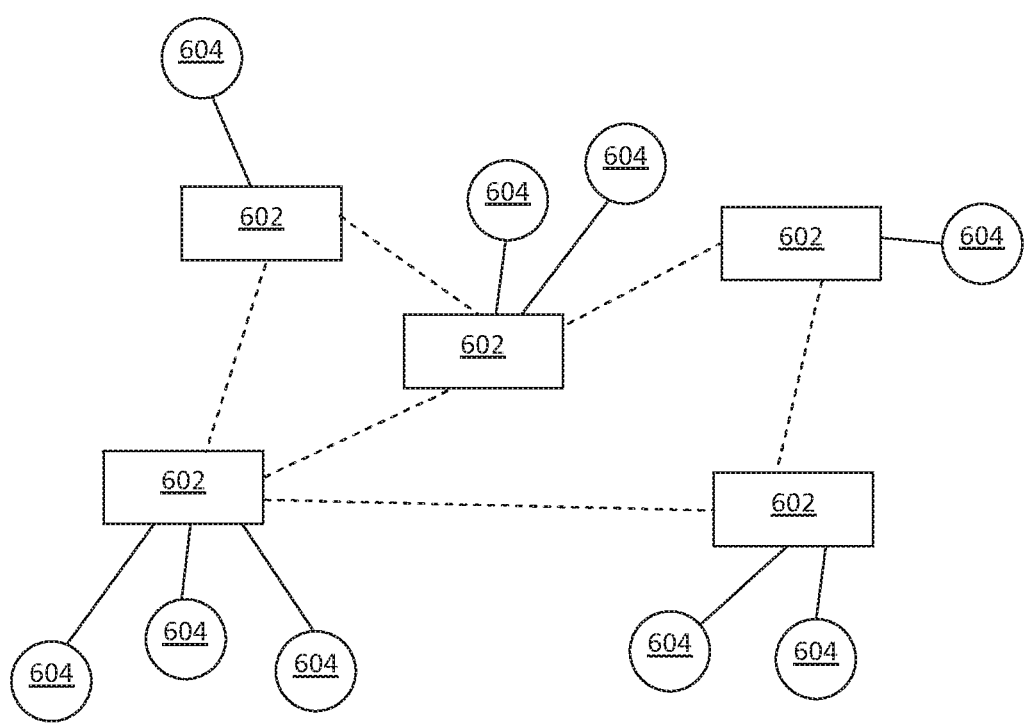
FIG. 6 is a simplified schematic of an example of a computer network.

FIG. 6 is an example of a computer network 600 comprising a plurality of nodes 602. The nodes 602 each have a plurality of tenants 604, (also termed users herein). Example communication links are also shown as dotted lines. The tenants 604 may comprise end users, packages of machine readable instructions (e.g. software or firmware programs) or other nodes 602. The methods of FIGS. 1 and 2 could be used respectively in commissioning or decommissioning a node 602 in, or for use in, such a network 600. The methods set out in FIG. 5 could be used in issuing a cryptographic identity to a tenant 604. The apparatus of FIG. 4 may serve as a node 602. A node 602 may comprise a component of a data centre. In some examples, there is a large number of nodes, which may be spread over a wide geographical area. The tenants 604 may have differing security protocols and different capabilities.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus such as the processor 302, or the processor 402 may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage such as the memory 310 or memory 404 that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realise functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
using first cryptographic key data specific to a computing device to verify a package of machine readable instructions to run on the computing device;
executing, by the computing device, the verified package, wherein the execution of the verified package comprises:
generating a random number using a true random number generator of the computing device, and storing the generated random number;
producing second cryptographic key data, the second cryptographic key data generated by a pseudorandom number generator of the computing device based on a seed comprising a combination of a first seed portion and a second see portion, the first seed portion comprising the random number generated by the true random number generator of the computing device; and
sending a portion of the second cryptographic key data to a certifying authority; and
receiving, from the certifying authority, a certification value based on the sent portion of the second cryptographic key data, and storing the certification value.

2. The method of claim 1, comprising storing, in a memory, at least one of the first cryptographic key data and the random number generated by the true random number generator.

3. The method of claim 1, comprising storing the first cryptographic key data and the random number generated by the true random number generator in respective separate one-time programmable memories of the computing device.

4. The method of claim 1, wherein the using, the executing, and the receiving are performed in a trusted environment.

5. The method of claim 1, wherein the second seed portion is a secret of an operator of the computing device.

6. The method of claim 1, wherein the first cryptographic key data is hardcoded to a memory by an in-system programmer of the computing device.

7. The method of claim 1, further comprising verifying received packages of machine readable instructions using the first cryptographic key data.

8. The method of claim 1, further comprising:
receiving a request for invalidation of the certification value;
verifying, using the second cryptographic key data, that the request comprises the second seed portion; and
responsive to the verifying that the request comprises the second seed portion:
requesting that the certification value be revoked at the certifying authority; and
deleting at least one of the certification value and the random number generated by the true random number generator stored on the computing device.

9. The method of claim 1, wherein the first cryptographic key data is based on a treatment of a public key for the computing device.

10. The method of claim 1, comprising:
deriving a public key portion and a private key portion from the second cryptographic key data,
wherein the portion of the second cryptographic key data sent to the certifying authority is the public key portion.

11. The method of claim 1, comprising:
storing the random number generated by the true random number generator in a one-time programmable memory.

12. A computing device comprising:
a processor, a first key data memory portion, a second key data memory portion, a true random number generator, and a pseudorandom number generator,
wherein the first key data memory portion is to store a first cryptographic key data of the computing device, and the second key data memory portion is to store a random number, generated by the true random number generator,
wherein the processor is to verify machine-readable instructions using the first cryptographic key data,
wherein the pseudorandom number generator is to generate output data using a seed comprising a combination of a first seed portion and a second seed portion, the first seed portion based on the random number in the second key data memory portion, and
wherein the processor is to send a portion of the output data to a certifying authority, and receive, from the certifying authority, a certification value based on the portion of the output data.

13. The computing device of claim 12, further comprising a third key data memory portion to store user cryptographic key data generated using the true random number generator.

14. The computing device of claim 13, wherein the processor is to generate the user cryptographic key data following verification that a request to generate a cryptographic identity for a user comprises the second seed portion.

15. The computing device of claim 12, wherein the pseudorandom number generator and the first and second key data memory portions are tamper proof.

16. The computing device of claim 12, wherein the processor is to:
derive a public key portion and a private key portion from the output data,
wherein the portion of the output data is the public key portion.

17. The computing device of claim 12, wherein the second seed portion comprises a secret of an operator of the computing device.

18. A non-transitory computer readable medium comprising instructions that when executed cause a computing device to:
receive operator key data from an operator of the computing device;
verify the operator key data by:
generating a key using the operator key data and a random number generated by a true random number generator in the computing device, and
verifying the generated key against a certificate held in a memory of the computing device, the certificate having been generated based on the verified operator key data and the random number; and
use the random number to provide a first user identity key portion for generating an identity for a user of the computing device.

19. The non-transitory computer readable medium of claim 18, further comprising instructions that when executed cause the computing device to:
request a second user identity key portion from the user of the computing device; and
combine the first and second user identity key portions to derive the identity for the user of the computing device.

20. The non-transitory computer readable medium of claim 19, further comprising instructions that when executed cause the computing device to:
generate the identity for the user by using a combination of the first and second user identity key portions as a seed input to a pseudorandom number generator.

* * * * *